(12) United States Patent
Kraus

(10) Patent No.: US 7,114,632 B2
(45) Date of Patent: Oct. 3, 2006

(54) SEALING COVER

(75) Inventor: Willibald Kraus, Gründstadt (DE)

(73) Assignee: TRW Automotive Electronics & Components GmbH & Co. KG, (DE)

( * ) Notice: Subject to any disclaimer, the term of this patent is extended or adjusted under 35 U.S.C. 154(b) by 54 days.

(21) Appl. No.: 10/476,830

(22) PCT Filed: May 2, 2002

(86) PCT No.: PCT/DE02/01594

§ 371 (c)(1), (2), (4) Date: Jun. 9, 2004

(87) PCT Pub. No.: WO02/090171

PCT Pub. Date: Nov. 14, 2002

(65) Prior Publication Data

US 2004/0232159 A1    Nov. 25, 2004

(30) Foreign Application Priority Data

May 4, 2001    (DE) ............................ 201 07 612 U

(51) Int. Cl.
- B65D 39/04   (2006.01)
- B65D 43/04   (2006.01)
- B65D 43/08   (2006.01)

(52) U.S. Cl. ...................... 220/802; 215/355; 220/804; 220/DIG. 19

(58) Field of Classification Search ........ 220/801–804, 220/796, DIG. 19, 363; 215/363, 355
See application file for complete search history.

(56) References Cited

U.S. PATENT DOCUMENTS

| | | | | |
|---|---|---|---|---|
| 2,266,270 A * | 12/1941 | Roth | ........................... | 215/317 |
| 3,165,227 A * | 1/1965 | Muoio et al. | ................ | 220/800 |
| 4,227,625 A * | 10/1980 | Underwood | ................ | 220/789 |
| 4,504,009 A * | 3/1985 | Boik et al. | .................... | 229/5.5 |
| 4,646,932 A * | 3/1987 | Masler | ........................ | 220/789 |
| 4,682,707 A * | 7/1987 | Wiles | .......................... | 220/789 |
| 4,801,040 A | 1/1989 | Kraus | | |
| 4,938,378 A | 7/1990 | Kraus | | |
| 4,953,742 A | 9/1990 | Kraus | | |
| 4,998,642 A | 3/1991 | Kraus | | |
| 5,071,022 A | 12/1991 | Sick | | |
| 5,317,924 A * | 6/1994 | Maack | ......................... | 73/756 |
| 5,709,309 A * | 1/1998 | Gallagher et al. | ........... | 220/229 |
| 6,296,136 B1 * | 10/2001 | Huet | ........................... | 220/233 |
| 6,360,779 B1 * | 3/2002 | Wagner et al. | ................. | 138/92 |
| 6,390,042 B1 * | 5/2002 | Scott et al. | .............. | 123/90.17 |

\* cited by examiner

Primary Examiner—Nathan J. Newhouse
Assistant Examiner—Niki M. Eloshway
(74) Attorney, Agent, or Firm—Fay, Sharpe, Fagan, Minnich & McKee, LLP

(57) ABSTRACT

The invention relates to a sealing cover 1, 1' made of plastic, especially for sealing an opening in a support 50; 51; 52, with a base body 10; 10', which merges into a circumferential collar 20, which transitions into an elastic sealing lip positioning itself against one side of a support, with the collar (20) presenting, at its outer circumference, an engaging ring 25; 25', and with the sealing cover 1; 1' designed in one single piece consisting of a thermoplastic elastomer and between the engaging ring 25; 25' and the sealing lip 30; 30' at least one second engaging ring 28 being arranged at the outer circumference of the collar 20.

29 Claims, 3 Drawing Sheets

Figure 7:
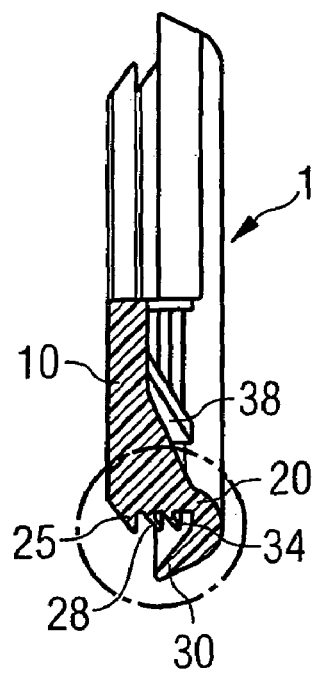

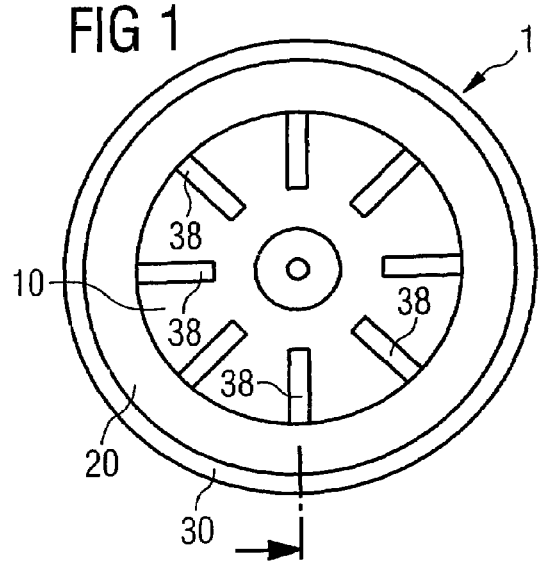
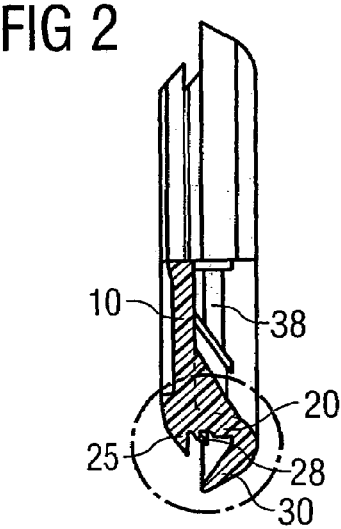
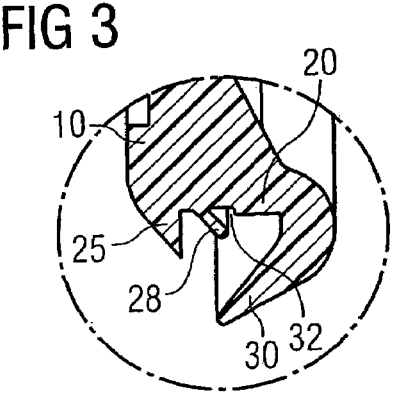
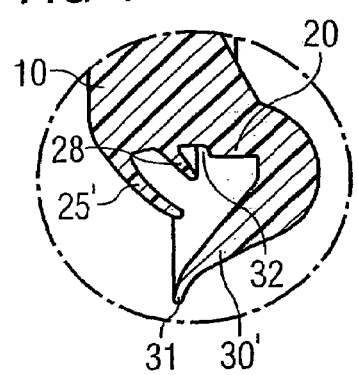
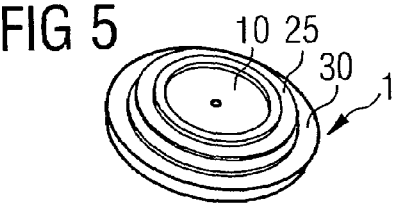
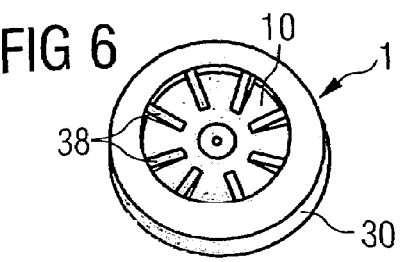

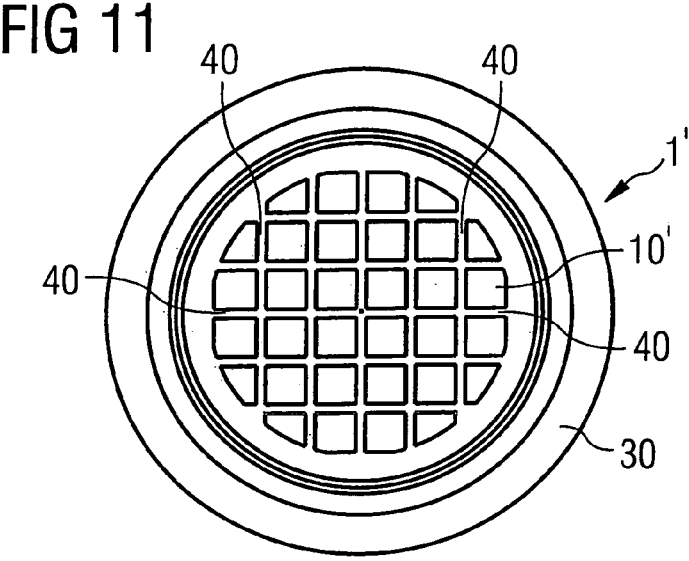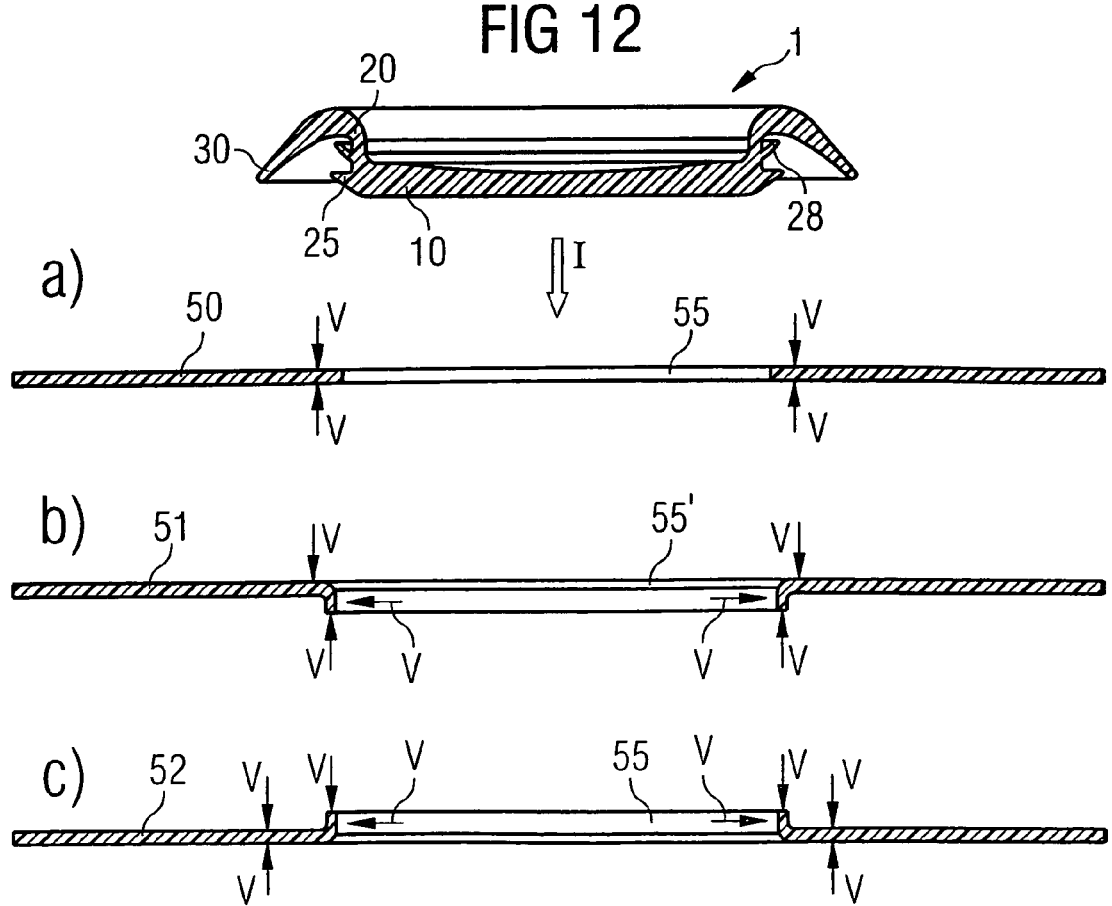

SEALING COVER

The invention relates to a sealing cover made of plastic, especially for sealing an opening in a support, comprising a base body, which is joined to a peripheral collar, which merges into an elastic sealing lip which lies against the side of a support, with the collar presenting an engaging ring at its outer circumference.

Numerous specific embodiments of sealing covers of the initially understood type are already known as state of the art. One of these known sealing covers of plastic (DE 38 31 433 A1) is designed in such fashion that the engaging ring presents in the area of the opening two tightly against the opposing surfaces of the support abutting sealing surfaces. Consequently, a positive and force-locked connection is produced between the opening in a support and the sealing cover.

Other known sealing covers present ring shoulders which impinge upon the underside of a support plate (DE-GM G88 02 422, DE-AS 1 555 007).

In addition, sealing covers designed in two parts are known (DE 43 27 945 A1) which consists of a plastic cover component and a therewith connected plastic sealing component. All of these known sealing covers are intended only for very specific application fields and, moreover, are incapable of withstanding all temperature influences as they occur, for example, in the motor vehicle industry sector during production of motor vehicle bodies.

Until now it was necessary to employ two different embodiments of sealing covers in this specific application sector, namely one sealing cover which is used prior to priming—in this case there must be the assurance of non-deformability in excess of 185° C. and water-tight sealing—and, furthermore, another cover, which was installed after assembly, relative to which consideration had to be given to temperature ranges between 90° and 130° C., for example in applying coating lacquer or with respect to subsequent lacquer applications.

For all aforementioned application examples it was, therefore, necessary until now to install different sealing covers in order to take into consideration the different temperature influences and also for assuring secure and water-tight fastening to the different support openings (for example smooth support opening or with collar).

Accordingly, the present invention is based on the object of creating a sealing cover of the initially stated type, which can be used for all applications, that is to say both in regard to temperature as well as in regard to the design of the support opening.

Said object is solved according to the invention in that the sealing cover which is designed in one piece is made of a thermoplastic elastomer and that between the engaging ring and the sealing lip at least one second engaging ring is arranged at the outer circumference of the collar.

By means of said combinative effect of material and design in shape, a sealing cover is produced of uniform design which can be used for all applications. There is guaranty with respect to excellent lacquer adhesion as well as excellent PVC adhesion, also excellent combination of presence of temperature resistance up to 185° C., water-tight sealing at ambient temperature, including perfect non-deformability. Thus there beneficially exists a specific uniform embodiment for all temperature requirements, regardless of the shape of the opening to be sealed off in the support.

In further embodiment of the invention, the second engaging ring may be oriented towards the underside of the sealing lip, with the first engaging ring protruding beyond the second engaging ring.

According to another specific embodiment, the collar of the sealing cover may present in the region of the second engaging ring a circumferential recess into which,—when needed—the second engaging ring can, for example, embed itself in installed position.

According to another specific embodiment variation of the invention, a third engaging ring may be arranged at the outer circumference of the collar between the second engaging ring and the sealing lip. In said case, the third engaging ring can extend in parallel with the second engaging ring and be oriented towards the underside of the sealing lip. Alternatively, there also exists the possibility of the third engaging ring being oriented towards the second engaging ring.

The third engaging ring can either present the same height as the second engaging ring or protrude in height beyond the second engaging ring.

According to another specific embodiment of the invention, the third engaging ring may beneficially lie in the recess which is formed by the circumferential, elastic sealing lip oriented towards the first engaging ring.

The base body of the invention-specific sealing cover can present several ribs in the area of the sealing lip, whereby said ribs are beneficially positioned diagonally vis-a-vis each other and are in the shape of a cone. As a result, there is assurance of excellent non-deformability, even in installed state.

According to another characteristic of the invention, the ribs may be shorter than the inner circumference of the base body.

Alternatively, there exists the possibility that the base body presents lattice-like extending ribs in the region of the sealing lip, which prevents, for example an unwelcome shrinking of the material in case of high temperature influence, since the respective honeycombs are filled with PVC.

The collar can project beyond the base body on one or on both sides.

Moreover, there exists the possibility that the first engaging ring projects beyond the second and the third engaging ring.

In the following, the invention is described in more detail by means of exemplary embodiments represented in the drawing. The drawing depicts:

FIG. 1 a bird's eye view of the invention-specific sealing cover;

FIG. 2 a partial section through the sealing cover according to FIG. 1;

FIG. 3 an enlarged representation of the partial section according to FIG. 2;

FIG. 4 another embodiment possibility of the sealing cover in partial section, analogous to FIG. 3;

FIGS. 5 & 6 perspective views of the invention-specific sealing cover;

FIGS. 7, 8, 9 & 10 other embodiments of the sealing cover, in lateral views, partially sectioned and in magnified representation;

FIG. 11 another embodiment possibility of the sealing cover in bird's eye view;

FIG. 12a–c various installation variations of the sealing cover for connection with a support, in lateral view, sectioned.

A sealing cover 1 made of plastic is depicted in FIG. 1 to 3; said sealing cover serving especially for sealing an opening 55, represented in FIG. 12, in a support 50, 51 or 52, presenting various shapes. Said sealing cover 1 presents a base body 10, which merges into a circumferential collar 20. The collar 20 merges into an elastic sealing lip 30 abutting against one side of the support and presents, at its outer circumference, an engaging ring 25.

The sealing cover designed as one single piece consists of a thermoplastic elastomer. Between the engaging ring 25 according to FIGS. 2 and 3 and the sealing lip 30 is arranged a second engaging ring 28 at the outer circumference of the collar 20. Said second engaging ring 28 is oriented towards the underside of the sealing lip 30.

It is especially apparent from FIGS. 1 and 5 that the base body has several ribs 38 in the region of the sealing lip 30, which can be positioned diagonally opposite each other and can, for example, be wedge-shaped. Said ribs 38 are, for example, shorter than the inner periphery of the base body 10. This assures form-stable design, which retains its shape even if the invention-specific sealing cover is connected with a randomly shaped support.

In the specific embodiment according to FIG. 4, which presents a similar specific embodiment according to FIG. 3, depicted in section, the second engaging ring 28 is likewise oriented towards the underside of the sealing lip. Said sealing lip 30' is designed in more ample fashion than the sealing lip 30 and can transition into a type of "float skin" 31. Said "float skin" 31 is capable, for example, of equalizing any unevenness on the surface of a support 50 (FIG. 12a). In addition, the first engaging ring 25' projects beyond the second engaging ring 28.

Relative to the specific embodiments according to FIGS. 3 and 4, the collar 20 of the sealing cover 1 presents, in the region of the second engaging ring 28, a circumferential groove 32, into which, in installed position, the second engaging ring 28 can, for example, embed itself, at least in part.

According to other specific embodiments according to FIG. 7 to 10, a third engaging ring 34 and/or 34' can be arranged at the outer circumference of the collar between the second engaging ring 28 and the sealing lip 30. In keeping with such arrangement according to FIGS. 7 and 9, the third engaging ring 34 can extend parallel to the second engaging ring 28 and be oriented towards the underside of the sealing lip 30.

Figure 8:
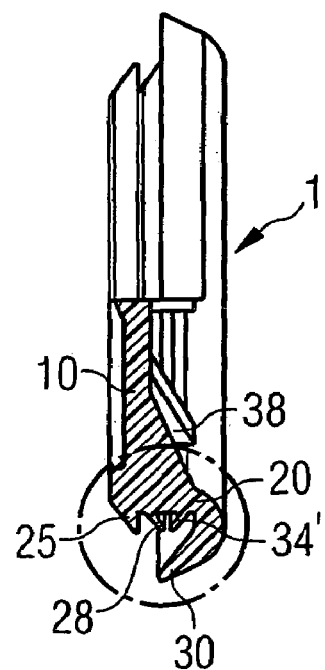
Figure 10:
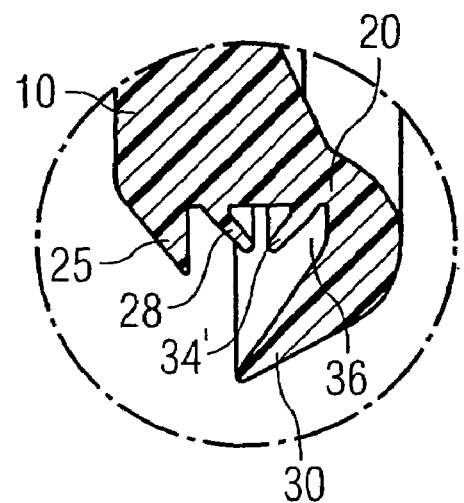

According to FIG. 8 or 10, there also exists the possibility of the third engaging ring 34' being oriented towards the second engaging ring 28.

In such arrangement, the third engaging ring 34 or 34' can be of the same height as the second engaging ring 28. Alternatively, there also exists the possibility that the third engaging ring protrudes in height beyond the second engaging ring 28.

Figure 9:
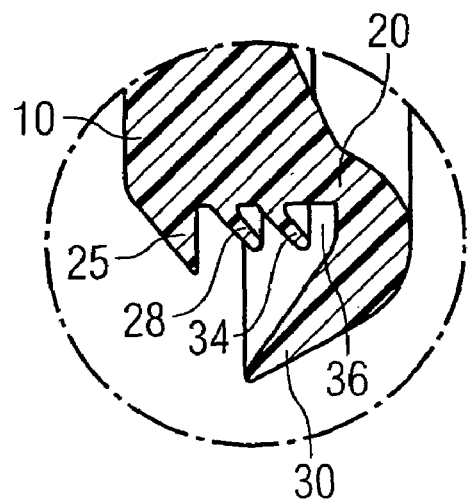

It is especially apparent from FIGS. 9 and 10 that with respect to both embodiment possibilities, the third engaging ring 34 and/or 34' is positioned in the groove 36 which is formed by the circumferential, elastic sealing lip 30 oriented towards the first engaging ring 25. Alternatively, the sealing lip 30' may also be used according to FIG. 4.

With respect to the specific embodiment according to FIG. 1 to 10, the base body 10 can present—as indicated above—in the region of the sealing lip 30, several, for example, wedge-shaped ribs 38.

In the specific embodiment according to FIG. 11, there also exists the possibility that the base body presents in the region of the sealing lip 30 and/or 30', lattice-like extending ribs 40. Such lattice structures have the following functions: With presence of high temperatures, it is possible for the material of the invention-specific sealing cover to shrink, so that there is no longer assurance of water-tight shape. When performing treatment work on the vehicle body, the honeycombs of the lattice structures 40 are filled, for example, with PVC, resulting in avoiding any shrinking process and the sealing cover remains, overall, stable.

With respect to all represented specific embodiments, collar 20 unilaterally projects beyond the base body 10 and/or 10'. The possibility, however, also exists that said collar is arranged in such manner relative to the base body that the collar projects beyond the base body on both sides.

FIG. 12a–c depicts the installation of the invention-specific sealing cover 1 and/or 1' in different support designs: According to FIG. 12a, said support 50 constitutes a straight piece of sheet metal with an opening 55. In this arrangement, under the influence of temperature, fusion regions v exist on both sides of the support opening 55, with arrow I defining the installation direction of the invention-specific sealing cover 1 and/or 1'.

Said fusion regions result from the sealing lip 30 and/or 30' and the engaging rings 25, 28 and/or 34.

According to FIG. 12b, there exists a collar hole 55' in the direction of installation, whereby in this instance three fusion regions v result on both sides of the collar hole, namely by means of the sealing lip 30 and/or 30', the second and/or the third engaging ring 28 and 34 and/or 34' and the first engaging ring 25.

With respect to the specific embodiment according to FIG. 12c, in which the support 53 has a collar hole opposite the installation direction, there exist a total of four fusion regions v, i.e. by means of the sealing lip 30 and/or 30', the first engaging ring 25, the second engaging ring 28 and the third engaging ring 34 and/or 34'.

The fusion regions v all result from placement of sealing lip 30 and/or 30', the first engaging ring 25 and/or 25', the second engaging ring 28 and/or the third engaging ring 34 and/or 34' above and below the support 50 and/or 51 and/or 52, as well as at the inner circumference of the respective collar hole at which abuts the respective second engaging ring 34 and/or 34' and undergoes fusion with the support due to temperature influence.

As a result of the special design of the invention-specific sealing cover, there exists stability of form over all temperature ranges, with guaranteed temperature resistance of up to a maximum of 185° C. and at ambient temperature there exists water-tight and form-stable connection with the support. Consequently, the result is a sealing cover which can be employed for all applications and which has high shape retention stability. By means of the invention-specific sealing cover there is assurance of perfect covering of the so-called cutting edge, as it may be produced in the region of the support opening 55.

According to the invention, there thus results a sealing cover which has a very extensive application range and which is also capable of adjusting itself to deformations in the region of the support opening. The sealing cover can be round, oval or rectangular in shape.

The invention claimed is:

1. A sealing cover formed of a thermoplastic elastomer and adapted for sealing an opening in an associated support, the sealing cover comprising:

a base body which merges with a circumferential collar which transitions into an elastic sealing lip abutting against one side of an associated support, whereby the collar presents, at its outer circumference an engaging ring and between the engaging ring and the sealing lip at the outer circumference of the collar is arranged at least one second engaging ring and further wherein the outer circumference of the collar defines a circumferential groove adjacent said second engaging ring, wherein between the second engaging ring and the sealing lip there is arranged a third engaging ring at the outer circumference of the collar, and wherein the third engaging ring is oriented towards the second engaging ring.

2. The sealing cover according to claim 1, wherein the third engaging ring has the same height as the second engaging ring.

3. The sealing cover according to claim 1, wherein the third engaging ring projects in height above the second engaging ring.

4. The sealing cover according to claim 1 wherein the base body presents several ribs in the region of the sealing lip.

5. The sealing cover according to claim 1 wherein the collar projects beyond the base body on one or both sides.

6. The sealing cover according to claim 1 wherein the first engaging ring projects beyond the second and third engaging rings.

7. The sealing cover according to claim 1 wherein said circumferential groove is configured to receive said second engaging ring when the sealing cover is disposed in said opening of the associated support.

8. A sealing cover formed of a thermoplastic elastomer and adapted for sealing an opening in an associated support, the sealing cover comprising:
a base body which merges with a circumferential collar which transitions into an elastic sealing lip abutting against one side of an associated support, whereby the collar presents, at its outer circumference an engaging ring and between the engaging ring and the sealing lip at the outer circumference of the collar is arranged at least one second engaging ring and further wherein the outer circumference of the collar defines a circumferential groove adjacent said second engaging ring, wherein between the second engaging ring and the sealing lip there is arranged a third engaging ring at the outer circumference of the collar, and wherein the third engaging ring is positioned in the groove which is formed by the outer circumference of the collar, and the elastic sealing lip is oriented towards the first engaging ring.

9. A sealing cover formed of a thermoplastic elastomer and adapted for sealing an opening in an associated support, the sealing cover comprising:
a base body which merges with a circumferential collar which transitions into an elastic sealing lip abutting against one side of an associated support, whereby the collar presents, at its outer circumference an engaging ring and between the engaging ring and the sealing lip at the outer circumference of the collar is arranged at least one second engaging ring and further wherein the outer circumference of the collar defines a circumferential groove adjacent said second engaging ring, wherein the base body presents several ribs in the region of the sealing lip, and wherein the ribs are positioned diagonally opposite each other and have the shape of a wedge.

10. The sealing cover according to claim 9, wherein the ribs are shorter than the inner circumference of the base body.

11. A sealing cover formed of a thermoplastic elastomer and adapted for sealing an opening in an associated support, the sealing cover comprising:
a base body which merges with a circumferential collar which transitions into an elastic sealing lip abutting against one side of an associated support and which presents lattice-like extending ribs in the region of the sealing lip whereby the collar presents, at its outer circumference an engaging ring and between the engaging ring and the sealing lip at the outer circumference of the collar is arranged at least one second engaging ring and further wherein the outer circumference of the collar defines a circumferential groove adjacent said second engaging ring.

12. A sealing cover for insertion into an opening in an associated support for closing and sealing said opening, the sealing cover comprising:
a base body having a base body portion and a circumferential collar sized and adapted for insertion into the opening in the associated support, the circumferential collar defining a circumferential groove;
a peripheral elastic sealing lip formed integrally with said base body and extending radially outwardly of said circumferential collar to engage said associated support about said opening;
a first peripheral engaging ring extending radially outwardly of said circumferential collar at a location axially spaced from the sealing lip and adapted to engage said panel circumferential about said opening on the side of said associated support opposite said sealing lip; and,
at least one second peripheral engaging ring extending radially outwardly of said circumferential collar at a location between said peripheral elastic sealing lip and said first peripheral engaging ring, the at least one second peripheral engaging ring being selectively positioned in said circumferential groove when the sealing cover is received in said opening of said associated support, wherein the at least one second peripheral engaging ring includes a plurality of second peripheral engaging rings extending radially outwardly of said circumferential collar at locations between said peripheral elastic sealing lip and said first peripheral engaging ring, and wherein:
at least a first ring of said plurality of second peripheral engaging rings extends radially outwardly of said circumferential collar at a first angle whereby the first ring is oriented towards an underside of said sealing lip; and,
at least a second ring of said plurality of second peripheral engaging rings extends radially outwardly of said circumferential collar at a second angle whereby the second ring is oriented towards said first peripheral engaging ring.

13. The sealing cover according to claim 12 wherein said first engaging ring extends radially outwardly from said collar beyond a radial outward extent of said at least one second peripheral engaging ring.

14. The sealing cover according to claim 12 wherein said first ring and said second ring extend radially outwardly from said collar to a substantially similar radial outward extent.

15. A sealing cover for insertion into an opening in an associated support for closing and sealing said opening, the sealing cover comprising:
a base body having a base body portion and a circumferential collar sized and adapted for insertion into the opening in the associated support, the circumferential collar defining a circumferential groove;
a peripheral elastic sealing lip defining a groove and being formed integrally with said base body and extending radially outwardly of said circumferential collar to engage said associated support about said opening;

a first peripheral engaging ring extending radially outwardly of said circumferential collar at a location axially spaced from the sealing lip and adapted to engage said panel circumferential about said opening on the side of said associated support opposite said sealing lip; and, at least one second peripheral engaging ring extending radially outwardly of said circumferential collar at a location between said peripheral elastic sealing lip and said first peripheral engaging ring, wherein the at least one second peripheral engaging ring includes a plurality of second peripheral engaging rings extending radially outwardly of said circumferential collar at locations between said peripheral elastic sealing lip and said first peripheral engaging ring, and at least one of said plurality of second peripheral engaging rings are selectively movable into said groove when the sealing cover is received in said opening of said associated support.

16. The sealing cover according to claim 15 wherein the base body includes a plurality of ribs formed on said base body portion thereof.

17. The sealing cover according to claim 16 wherein said plurality of ribs are wedge-shaped and are arranged on opposite sides in an opposed relationship on said base body portion.

18. The sealing cover according to claim 15 wherein the base body includes a plurality of lattice-like extending ribs arranged on said base body portion thereof.

19. The sealing cover according to claim 15 wherein said circumferential collar extends axially beyond an axial extent of a thickness of said base body portion.

20. The sealing cover according to claim 15 wherein said first peripheral engaging ring extends radially outwardly from said collar beyond a radial outward extent of said plurality of second peripheral engaging rings.

21. A sealing cover adapted for sealing an opening in an associated support, the sealing cover comprising:

a base body which merges with a circumferential collar which transitions into an elastic sealing lip abutting against one side of the associated support;

an engaging ring carried on an outer circumference of said collar;

at least one second engaging ring carried on the outer circumference of said collar and disposed between the engaging ring and the sealing lip; and, a third engaging ring on the outer circumference of the collar between the second engaging ring and the sealing lip, wherein the third engaging ring is oriented towards the second engaging ring.

22. The sealing cover according to claim 21 wherein the second engaging ring is oriented towards the underside of the sealing lip.

23. The sealing cover according to claim 21 wherein the first engaging ring projects beyond the second engaging ring.

24. The sealing cover according to claim 21 wherein the outer circumference of the collar defines a circumferential groove adjacent said second engaging ring.

25. The sealing cover according to claim 21 wherein the base body presents several ribs in the region of the sealing lip.

26. The sealing cover according to claim 25 wherein the ribs are shorter than the inner circumference of the base body.

27. The sealing cover according to claim 21 wherein the base body presents lattice-like extending ribs in the region of the sealing lip.

28. The sealing cover according to claim 21 wherein the collar projects beyond the base body on one or both sides.

29. The sealing cover according to claim 21 wherein the first engaging ring projects beyond the second and third engaging rings.

* * * * *